United States Patent
Liu

(10) Patent No.: US 8,220,626 B2
(45) Date of Patent: Jul. 17, 2012

(54) PROTECTIVE COVER ASSEMBLY FOR CAMERA MODULE AND PORTABLE ELECTRONIC DEVICE USING SAME

(75) Inventor: Cong Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 289 days.

(21) Appl. No.: 12/481,682

(22) Filed: Jun. 10, 2009

(65) Prior Publication Data

US 2010/0230308 A1    Sep. 16, 2010

(30) Foreign Application Priority Data

Mar. 16, 2009  (CN) .......................... 2009 1 0300884

(51) Int. Cl.
*H05K 5/03*   (2006.01)

(52) U.S. Cl. ................. 206/320; 455/575.8; 361/679.01
(58) Field of Classification Search ............. 361/679.01, 361/728; 369/292; 206/320; 455/575.8
See application file for complete search history.

(56) References Cited

U.S. PATENT DOCUMENTS

| | | | | |
|---|---|---|---|---|
| 2,748,651 | A * | 6/1956 | Simjian | 355/64 |
| 3,327,601 | A * | 6/1967 | Fish | 396/481 |
| 4,156,567 | A * | 5/1979 | Ostrowski | 396/89 |
| 7,295,390 | B2 * | 11/2007 | Miki | 359/824 |
| 2004/0212702 | A1* | 10/2004 | Suh | 348/240.99 |
| 2004/0228075 | A1* | 11/2004 | Moriguchi et al. | 361/680 |
| 2006/0017836 | A1* | 1/2006 | Nuno et al. | 348/360 |
| 2008/0075453 | A1* | 3/2008 | Utz | 396/452 |

FOREIGN PATENT DOCUMENTS

CN    201181372 Y    1/2009

* cited by examiner

*Primary Examiner* — Jacob K Ackun
(74) *Attorney, Agent, or Firm* — Altis Law Group, Inc.

(57) ABSTRACT

A protective cover assembly is mounted within a portable electronic device. The portable electronic device defines a through hole. The protective cover assembly includes a resisting portion including a first positioning portion and a second positioning portion, a shielding cover and an elastic member offering an elastic force to make the resisting portion abut against the shielding cover. When the shielding cover resisting the first positioning portion, the shielding cover shields the through hole. When the shielding cover resisting the second positioning portion, the shielding cover exposes the through hole.

10 Claims, 5 Drawing Sheets

PROTECTIVE COVER ASSEMBLY FOR CAMERA MODULE AND PORTABLE ELECTRONIC DEVICE USING SAME

BACKGROUND

1. Technical Field

The present disclosure relates to protective cover assemblies for camera module and, particularly, to a protective cover assembly for camera module used in a portable electronic device.

2. Description of Related Art

Camera modules are widely used in portable electronic devices. To protect a camera module from dust, water and etc, a protective cover can be slidably or rotatably mounted on the outside of a portable electronic device.

Although useful for protecting the camera module, because covers are mounted on the outside they increase the size of the device and are not attractive.

Therefore, there is room for improvement within the art.

BRIEF DESCRIPTION OF THE DRAWINGS

Many aspects of a protective cover assembly for a camera module can be better understood with reference to the following drawings. These drawings are not necessarily drawn to scale, the emphasis instead being placed upon clearly illustrating the principles of the present protective cover assembly for a camera module. Moreover, in the drawings like reference numerals designate corresponding sections throughout the several views.

DETAILED DESCRIPTION

Figure 1:
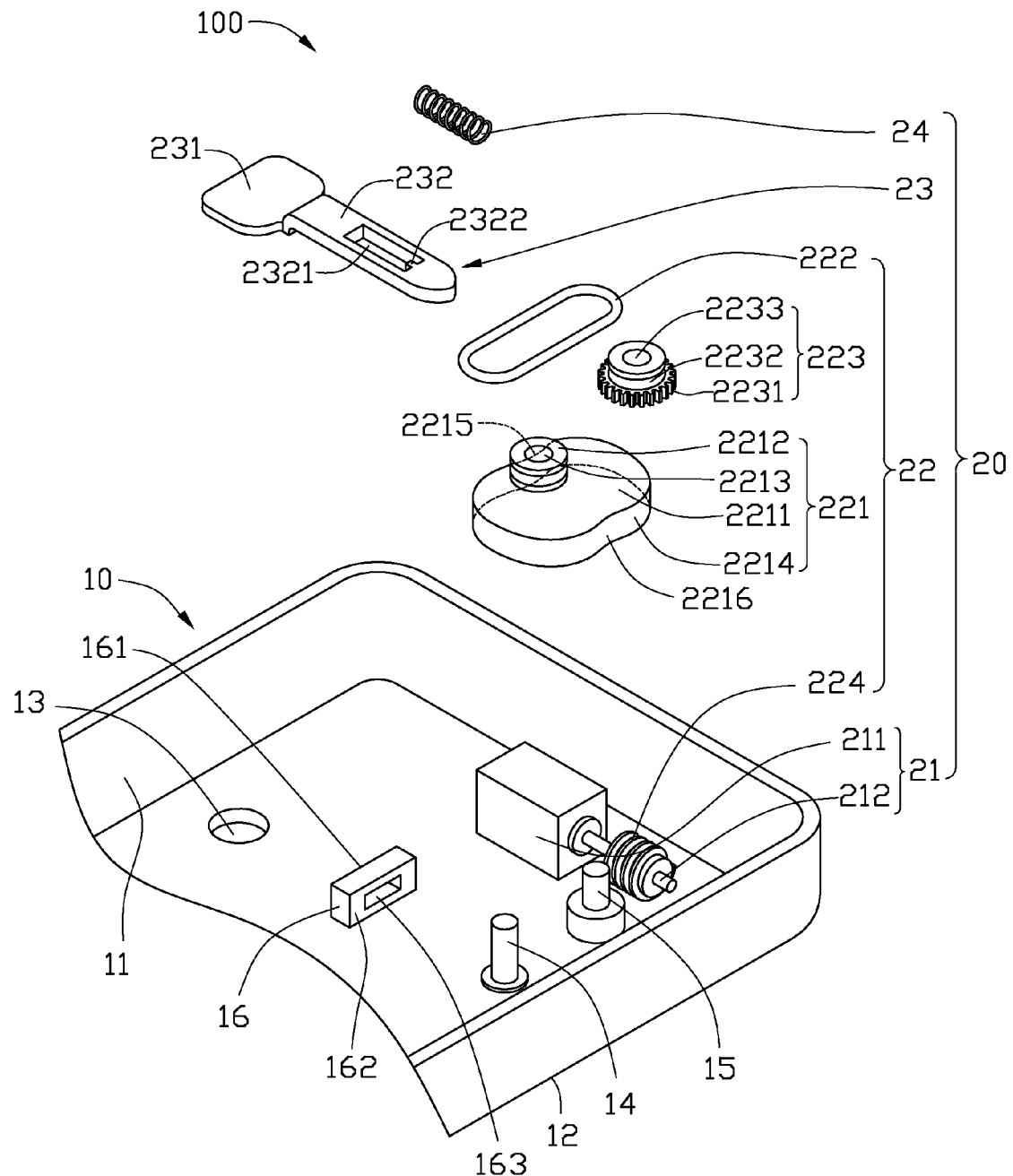
FIG. 1 is an isometric, exploded view of a mobile phone with a protective cover assembly for a camera module of the mobile phone, in accordance with a first exemplary embodiment.

The present protective cover assembly is suitable for use in portable electronic devices, e.g., a mobile phone, a personal digital assistant, or a palm computer. Referring to FIG. 1, a protective cover assembly 20 according to a first exemplary embodiment is incorporated in a mobile phone 100. The mobile phone 100 includes a housing 10, a camera module (not shown), and the protective cover assembly 20 mounted within the housing 10 for covering the camera module.

The housing 10 includes a peripheral wall 11 and a bottom wall 12 connected to the peripheral wall 11. The housing 10 defines a through hole 13 in the bottom wall 12 for exposing the camera module. In the first embodiment, the through hole 13 is round. The camera module is disposed inside the housing 10 aligned with the through hole 13. Thus, the camera module can capture images via the through hole 13. The housing 10 further includes a first mounting pole 14, a second mounting pole 15, and a fastening block 16 protruding from an inside surface of the bottom wall 12. The first mounting pole 14 and the second mounting pole 15 are arranged adjacent to the peripheral wall 11. The second mounting pole 15 is adjacent to the first mounting pole 14. The fastening block 16 is disposed between the through hole 13 and the first mounting pole 14. The fastening block 16 includes a first surface 161 facing the through hole 13 and a second surface 162 facing the first mounting pole 14. The fastening block 16 defines a first guiding slot 163 through the first surface 161 and the second surface 162.

The protective cover assembly 20 includes a power generating device 21, a transmission device 22, a shielding cover 23, and an elastic member 24. The power generating device 21 is connected to the shielding cover 23 by the transmission device 22, and is configured for driving the shielding cover 23 to slide relative to the housing 10. The elastic member 24 provides an elastic force to make the shielding cover 23 closely abut against the transmission device 22.

The power generating device 21 is an electric motor in the first exemplary embodiment. The power generating device 21 includes a converting portion 211 and a spindle 212. The converting portion 211 is mounted to the housing 10, and is configured to convert electrical energy into mechanical energy for rotating the spindle 211. The spindle 212 is connected to the converting portion 211, and can be driven to rotate by the converting portion 211.

The transmission device 22 includes an eccentric wheel 221, a driving belt 222, a worm gear 223, and a worm 224.

The eccentric wheel 221 includes a main body 2211 and a connecting shaft 2212 protruding from the main body 2211. The eccentric wheel 221 defines a mounting hole 2213 through the main body 2211 and the connecting shaft 2212. The eccentric wheel 221 is rotatably mounted to the first mounting pole 14 and the first mounting pole 14 is inserted into the connecting shaft 2212. The main body 2211 includes a resisting peripheral wall 2214. The resisting peripheral wall 2214 is generally elliptical and includes a first positioning portion, i.e., a close end 2215 and a second positioning portion, i.e., a distal end 2216 spaced farther from the connecting shaft 2212 than that of the close end 2215. The close end 2215 and the distal end 2216 both include an arced portion (not labeled).

Figure 2:
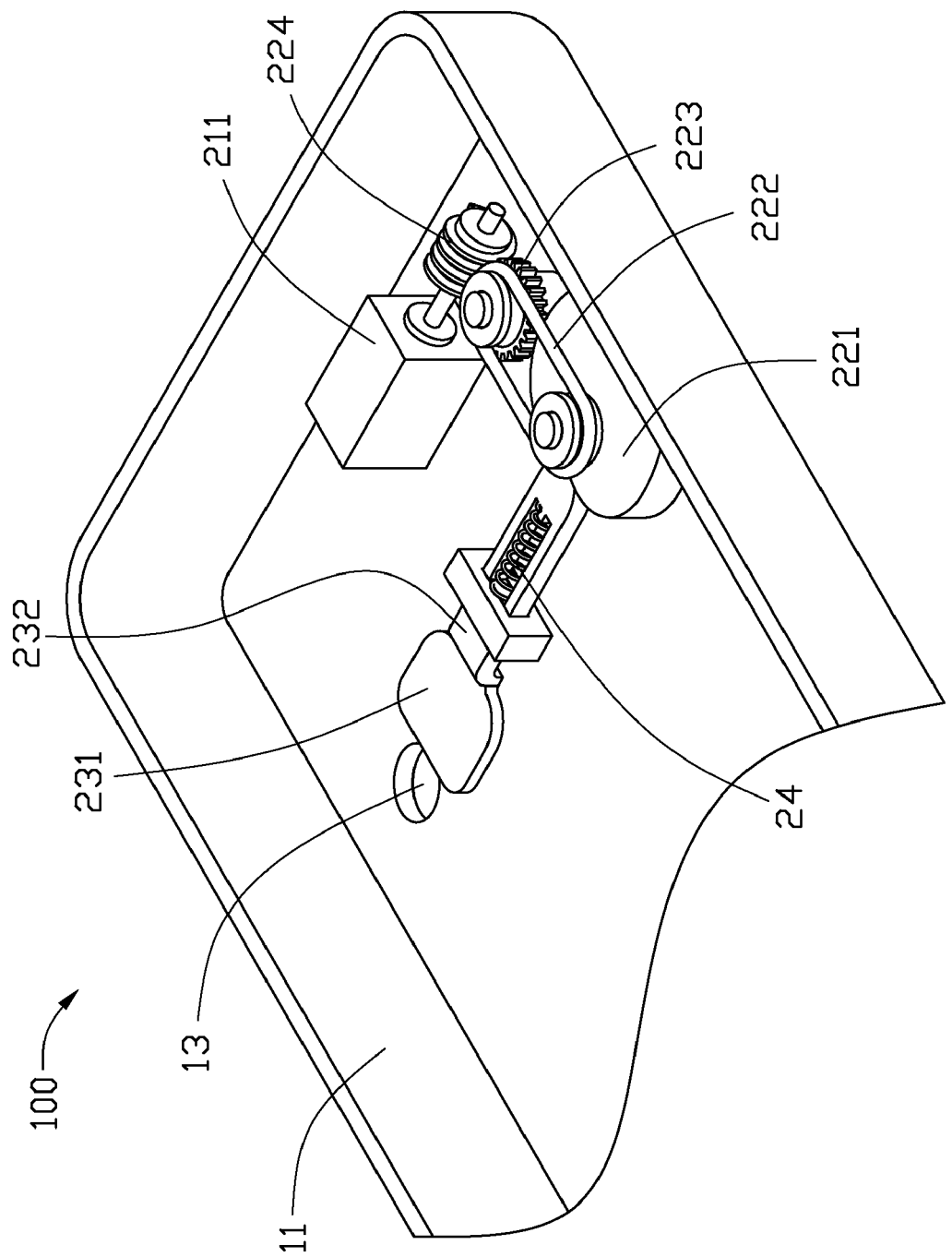
FIG. 2 is an isometric, assembled view of the mobile phone shown in FIG. 1, wherein the protective cover assembly is at an exposing position.

Referring to FIGS. 1 and 2, the worm gear 223 includes a worm gear body 2231 and a connecting body 2232 protruding from a side of the worm gear body 2231. The connecting body 2232 is columnar. One end of the driving belt 222 is tensioned around the connecting shaft 2212, the other around the connecting body 2232, thus connecting the worm gear 223 and the eccentric wheel 21 together. The worm gear 223 defines a mounting hole 2233 through the worm gear body 2231 and the connecting body 2232. The worm gear 223 is rotatably mounted to the second mounting pole 15.

The worm 224 is mounted to the spindle 212, and can rotate with the spindle 211. The worm 224 engages with the worm gear body 2231 of the worm gear 223.

The shielding cover 23 includes a shielding portion 231 and a resisting portion 232 connected to the shielding portion 231. The shielding portion 231 is large enough to completely shield the through hole 13. The resisting portion 232 is bar shaped, and has a receiving cavity 2321 defined therein, an interior wall surrounding the receiving cavity, and a column 2322 disposed in the receiving cavity 2321. The receiving cavity 2321 is used to receive the elastic member 24 therein. The column 2322 protrudes from the interior wall of the receiving cavity 2321, towards the shielding portion 231. The elastic member 24 can be a coil spring, and has an end mounted to the column 2322 and the other end resisting the second surface 162 of the fastening block 16.

Referring to FIG. 2, in assembly, the worm gear 223 is rotatably mounted to the second mounting pole 15, with the worm gear 223 engaging with the worm 224. The eccentric wheel 221 is rotatably mounted to the first mounting pole 14. The driving belt 222 is supported by the connecting shaft 2212 and the connecting body 2232. The resisting portion 232 of the shielding cover 23 abuts against the close end 2215 of the eccentric wheel 221 through the guiding slot 163 of the fastening block 16. The elastic member 24 is received in the receiving cavity 2321, with one end of the elastic member 24 resisting the fastening block 16, the other resisting the resisting portion 232. The resisting portion 232 tightly resists the resisting peripheral wall 2214 of the eccentric wheel 221 suppressed by the elastic member 24. Thus, the mobile phone 100 has been assembled, with the through hole 13 shielded by the shielding portion 231 of the shielding cover 23.

To expose the through hole 13, the power generating device 21 is triggered to work. The spindle 212 rotates the worm 211, which rotates the worm gear 223. Meantime, the driving belt 222 rotates the eccentric wheel 221 until the resisting portion 232 slides from the distal end 2216 to the close end 2215 along the resisting peripheral wall 2214. Thus, the shielding portion 231 of the shielding cover 23 slides towards the eccentric wheel 221 until the through hole 13 is completely exposed.

Figure 3:
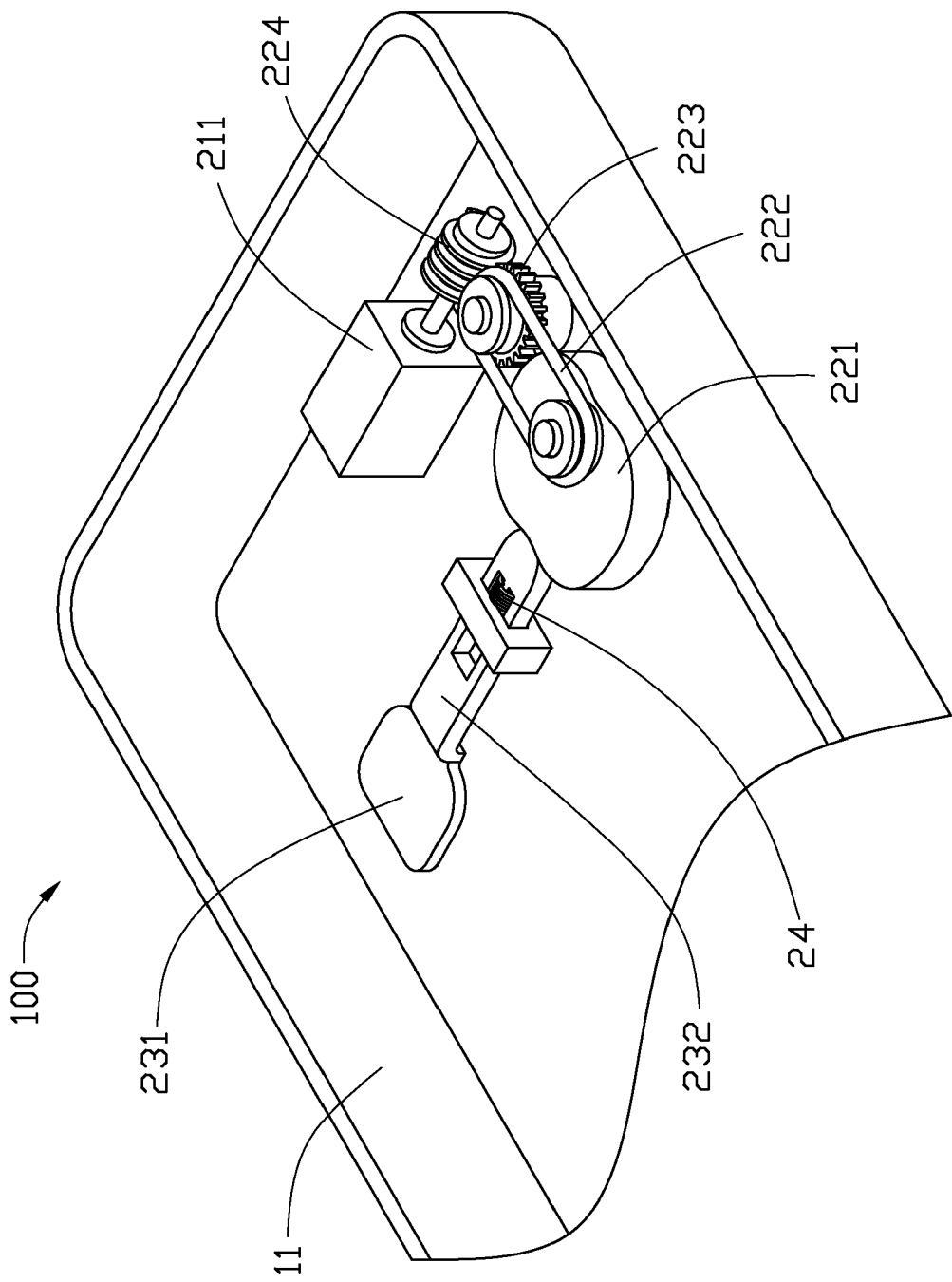
FIG. 3 is similar to FIG. 2, but the protective cover assembly is at a shielding position.

To shield the through hole 13 (FIG. 3), the power generating device 21 is triggered to work. The spindle 212 rotates the worm 211, which rotates the worm gear 223. Meantime, the driving belt 222 rotates the eccentric wheel 221 until the resisting portion 232 slides from the close end 2215 to the distal end 2216 along the resisting peripheral wall 2214. Thus, the shielding portion 231 of the shielding cover 23 slides to cover the through hole 13.

Figure 4:
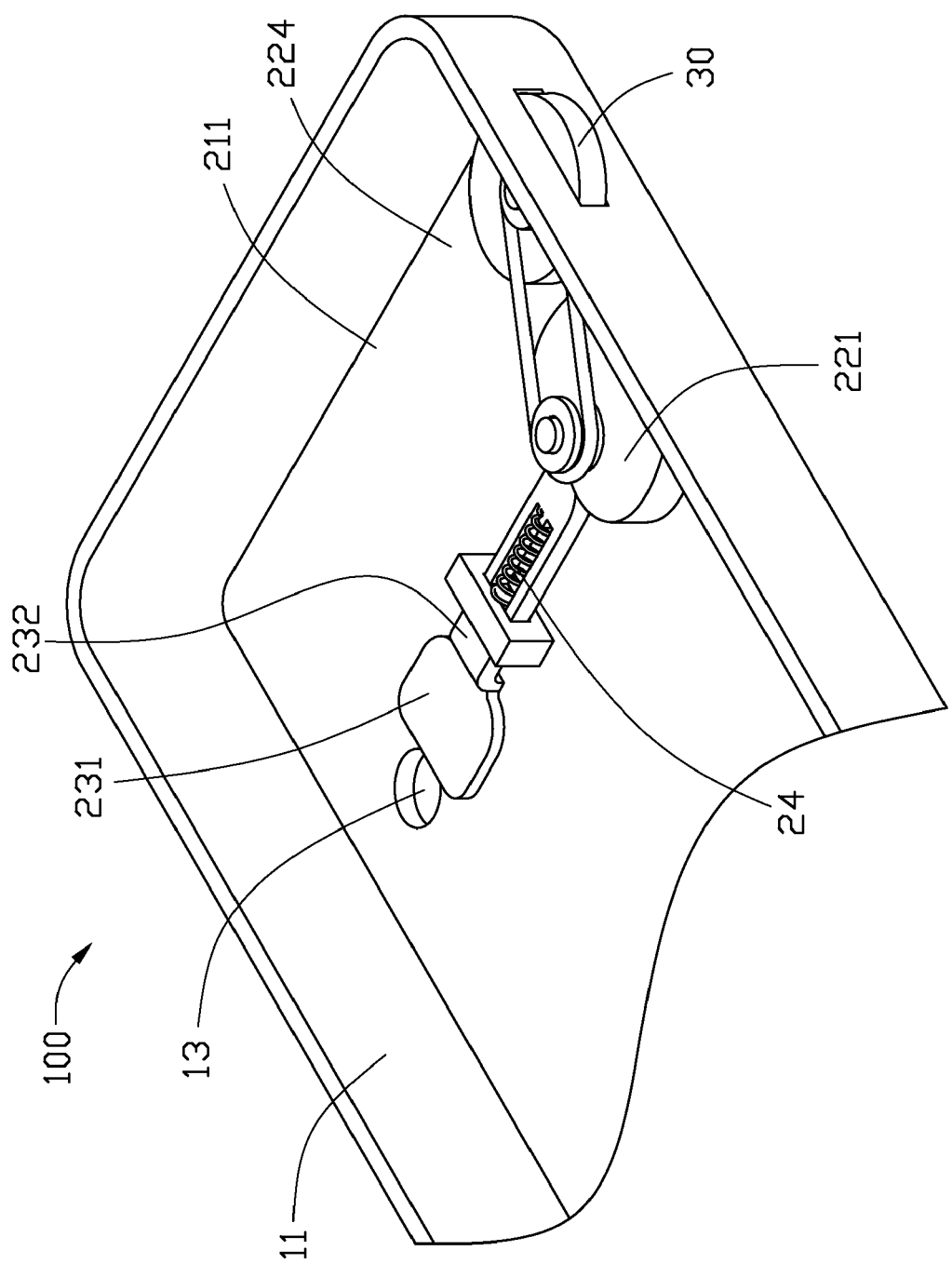
FIG. 4 is an isometric view of a mobile phone with the protective cover assembly for a camera module, in accordance with a second exemplary embodiment.

Referring to FIG. 4, in a second embodiment, the power generating device 21 and the worm 224 can be omitted, and the eccentric wheel 221 is manually driven by a rotator 30 instead. Correspondingly, the rotator 30 is partially exposed out of the mobile phone 100 through the peripheral wall 11 to facilitate use.

Figure 5:
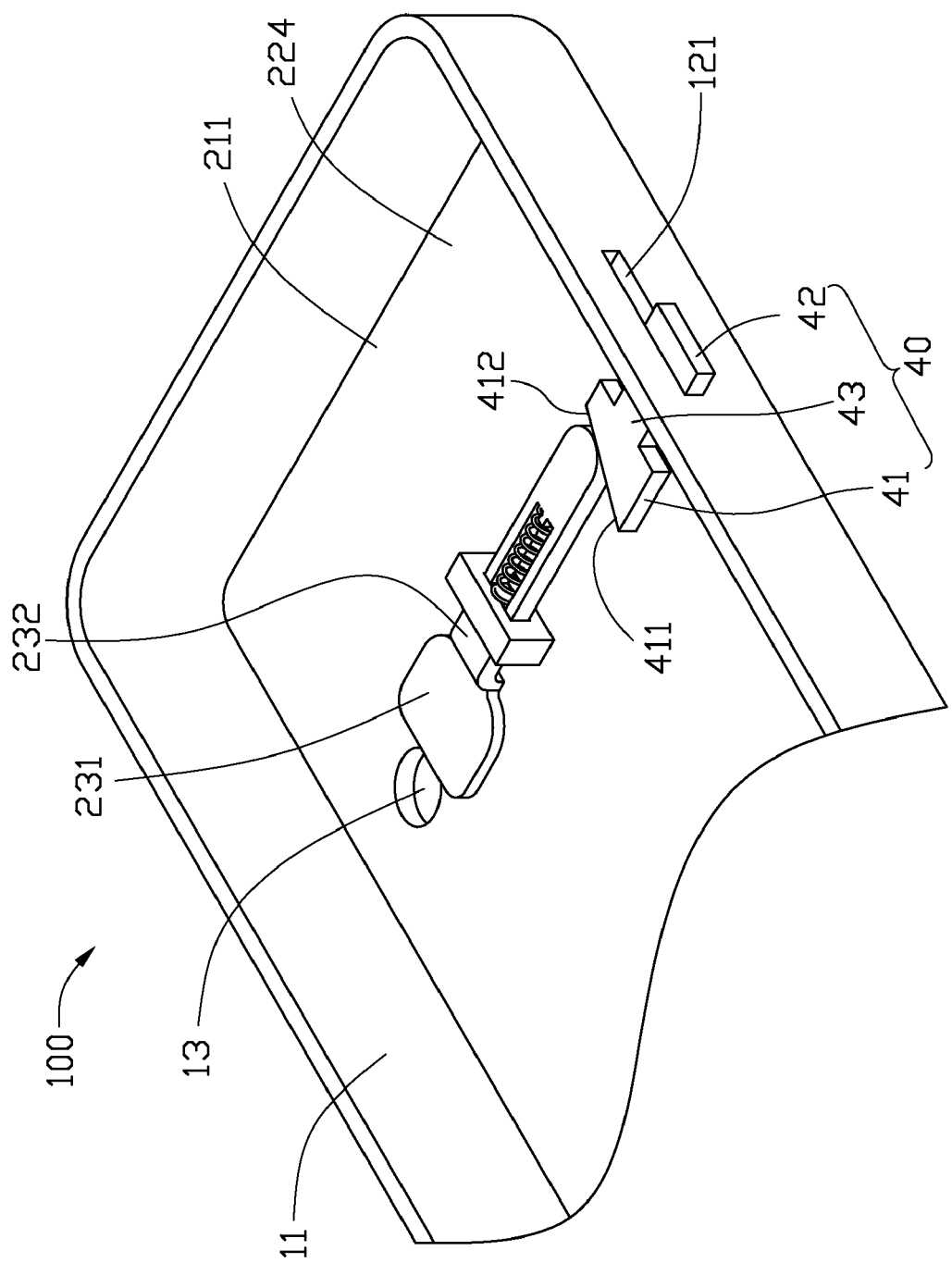
FIG. 5 is an isometric view of a mobile phone with the protective cover assembly for a camera module, in accordance with a third exemplary embodiment.

Referring to FIG. 5, in a third embodiment, the transmission device 22 can be replaced by other shaped resisting portions e.g., a slanted block 40. That is, the peripheral wall 11 defines a second sliding slot 121, the slanted block 40 includes a second resisting portion 41, an operating portion 42, and a connecting portion 43 connecting the second resisting portion 41 and the operating portion 42. The operating portion 42 can be slidably received in the second sliding slot 121. The second resisting portion 41 and the resisting portion 232 resist each other. The second resisting portion 41 includes a resisting surface (not labeled), and the resisting surface includes a first end 411 and a second end 412. When the resisting portion 232 resists the first end 411, the shielding cover 23 shields the through hole 13. When the resisting portion 232 resists the second end 412, the shielding cover 23 exposes the through hole 13.

The power generating device 21 powers the protective cover assembly 20 mounted within the mobile phone 100 to drive the shielding cover 23 to slide to cover or expose the through 13, thus effectively protecting the camera module opposite to the through hole 13.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A protective cover assembly mounted within a portable electronic device, the portable electronic device defines a through hole, the protecting cover assembly comprising:
    a transmission device including a first positioning portion, a second positioning portion, and an eccentric wheel defining a resisting peripheral wall, the first positioning portion and the second positioning portion formed on the resisting peripheral wall;
    a shielding cover abutting against and slidable relative to the transmission device between the first positioning portion and the second positioning portion so as to selectively cover or shield the through hole, the shielding cover comprising a shielding portion and a resisting portion connected to the shielding portion; and
    an elastic member offering an elastic force to urge the resisting portion of the shielding cover to closely abut the eccentric wheel.

2. The protective cover assembly as claimed in claim 1, wherein the eccentric wheel is driven by a power generating device.

3. The protective cover assembly as claimed in claim 1, wherein the shielding portion shields the through hole, the resisting portion is slidably mounted within the portable electronic device.

4. The protective cover assembly as claimed in claim 3, wherein a fastening block protrudes from the portable electronic device, the fastening block defines a sliding slot, the resisting portion is slidably received in the sliding slot.

5. The protective cover assembly as claimed in claim 4, wherein the resisting portion defines a receiving cavity, the receiving cavity receives the elastic member, one end of the elastic member abuts against the fastening block, the other against the resisting portion.

6. A portable electronic device including a housing and a protective cover assembly, the protective cover assembly mounted within the housing, the housing defining a through hole, the protective cover assembly comprising:
    a transmission device including a first positioning portion, a second positioning portion, and an eccentric wheel defining a resisting peripheral wall, the first positioning portion and the second positioning portion formed on the resisting peripheral wall;
    a shielding cover abutting against and slidable relative to the transmission device between the first positioning portion and the second positioning portion so as to selectively cover or shield the through hole, the shielding cover comprising a shielding portion and a resisting portion connected to the shielding portion; and
    an elastic member offering an elastic force to urge the resisting portion of the shielding cover to closely abut the eccentric wheel.

7. The protective cover assembly as claimed in claim 6, wherein the eccentric wheel is driven by a power generating device.

8. The protective cover assembly as claimed in claim 6, wherein the shielding portion shields the through hole, the resisting portion is slidably mounted within the housing.

9. The protective cover assembly as claimed in claim 8, wherein a fastening block protrudes from the housing, the fastening block defines a sliding slot, the resisting portion is slidably received in the sliding slot.

10. The protective cover assembly as claimed in claim 9, wherein the resisting portion defines a receiving cavity, the receiving cavity receives the elastic member, the cross-sectional area of the elastic member is larger than the resisting portion, one end of the elastic member abuts against the fastening block, the other against the resisting portion.

* * * * *